US008543094B2

(12) United States Patent
Lo et al.

(10) Patent No.: US 8,543,094 B2
(45) Date of Patent: *Sep. 24, 2013

(54) SYSTEM AND METHOD FOR CONFIGURING DEVICES FOR WIRELESS COMMUNICATION

(75) Inventors: Yuan-Chang Lo, Austin, TX (US); Liam Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/109,251

(22) Filed: May 17, 2011

(65) Prior Publication Data

US 2011/0223860 A1  Sep. 15, 2011

Related U.S. Application Data

(63) Continuation of application No. 12/104,781, filed on Apr. 17, 2008, now Pat. No. 7,974,606.

(51) Int. Cl.
H04M 3/16 (2006.01)
(52) U.S. Cl.
USPC ............. 455/411; 455/419; 455/41.2; 726/29
(58) Field of Classification Search
USPC ................... 455/411, 419, 41.2; 726/29
See application file for complete search history.

(56) References Cited

U.S. PATENT DOCUMENTS

| | | | |
|---|---|---|---|
| 6,611,913 B1 * | 8/2003 | Carroll et al. | 713/171 |
| 2002/0046127 A1 * | 4/2002 | Reding et al. | 705/26 |
| 2002/0161990 A1 * | 10/2002 | Zhang et al. | 713/1 |
| 2003/0231115 A1 * | 12/2003 | Stanners et al. | 340/574 |
| 2003/0232617 A1 * | 12/2003 | Ishihara et al. | 455/411 |
| 2005/0211784 A1 * | 9/2005 | Justin | 235/492 |
| 2006/0095385 A1 * | 5/2006 | Atkinson et al. | 705/64 |
| 2006/0183462 A1 | 8/2006 | Kolehmainen | 455/411 |
| 2006/0242692 A1 | 10/2006 | Thione et al. | 726/9 |
| 2007/0001805 A1 * | 1/2007 | Utter et al. | 340/5.72 |
| 2007/0079113 A1 | 4/2007 | Kulkarni et al. | 713/150 |
| 2007/0157020 A1 | 7/2007 | Lee et al. | 713/155 |
| 2007/0190939 A1 | 8/2007 | Abel | 455/41.2 |
| 2007/0293192 A9 | 12/2007 | De Groot | 455/411 |
| 2008/0126261 A1 | 5/2008 | Lovett | 705/72 |
| 2008/0275604 A1 * | 11/2008 | Perry et al. | 701/33 |

OTHER PUBLICATIONS

Wi-Fi Protected Setup, Wikipedia, http://en.wikipedia.org,/wiki/Wi-Fi_Protected_Setup; 2 pages, printed Dec. 22, 2008.

* cited by examiner

Primary Examiner — Danh Le
(74) Attorney, Agent, or Firm — Baker Botts L.L.P.

(57) ABSTRACT

A system and method for configuring devices for wireless communication are disclosed. A method may include transmitting an activation key from an activation broker to a wireless agent. The method may also include transmitting the activation key from the activation broker to a wireless registrar. At least one of the transmission of the activation key to the wireless agent and the transmission of the activation key to the wireless registrar may include transmitting the activation key via a short-range wireless communication technology. In addition, the activation key may include information for authenticating wireless communication between the wireless agent and a wireless access point.

17 Claims, 4 Drawing Sheets

SYSTEM AND METHOD FOR CONFIGURING DEVICES FOR WIRELESS COMMUNICATION

RELATED APPLICATIONS

This application is a continuation of pending U.S. patent application Ser. No. 12/104,781 filed Apr. 17, 2008 now U.S. Pat. No. 7,974,606, the contents of which is incorporated herein in its entirety by this reference.

TECHNICAL FIELD

The present disclosure relates in general to device configuration, and more particularly to a system and method for configuration of devices for wireless communication.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With recent advances in network technology and improved affordability of networking devices, information handling system users are increasingly implementing networks (e.g., local areas networks or LANs) that utilize wireless transmissions (e.g., wireless fidelity or "Wi-Fi") and wire-line transmissions in their homes and/or businesses. For example, users may implement a home or business network including an information handling system, one or more wireless-capable network devices, and a wireless access point communicatively coupled to the information handling system and network devices. Such a network may allow an information handling system (or a user thereof) to communicate with the one or more network devices via the wireless access point or vice versa.

However, despite the increasing popularity of home and business networking systems, configuration complexity of such systems has prevented widespread acceptance. While network installation and setup for experienced users has been greatly simplified with setup wizards and advances in usability features included in operating systems, network configuration remains a difficult challenge for many users, particularly home consumers. These configuration challenges lead to negative customer experience and numerous technical support calls. For example, one company has reported that it receives in excess of 20,000 technical support calls per day related to digital home products, the majority attributable to wireless access point installation and setup.

Accordingly, a need has arisen for systems and methods that allow implementation of network systems and the configuration of devices to allow wireless communications without the complexity incumbent in traditional approaches.

SUMMARY

In accordance with the teachings of the present disclosure, disadvantages and problems associated with configuring devices for wireless communication may be substantially reduced or eliminated.

In accordance with one embodiment of the present disclosure, a method for configuring devices for wireless communication is provided. The method may include transmitting an activation key from an activation broker to a wireless agent. The method may also include transmitting the activation key from the activation broker to a wireless registrar. At least one of the transmission of the activation key to the wireless agent and the transmission of the activation key to the wireless registrar may include transmitting the activation key via a short-range wireless communication technology. In addition, the activation key may include information for authenticating wireless communication between the wireless agent and a wireless access point.

In accordance with another embodiment of the present disclosure, a method for configuring devices for wireless communication is provided. The method may include receiving at a wireless agent an activation key from an activation broker via a short-range wireless communication technology, the activation key including information for authenticating wireless communication between the wireless agent and a wireless access point. The method may also include authenticating wireless communication between the wireless agent and the wireless access point based at least on the activation key information. The method may further include associating the wireless agent for wireless communication with the wireless access point.

In accordance with a further embodiment of the present disclosure, a method for configuring devices for wireless communication is provided. The method may include receiving at a wireless registrar associated with a wireless access point an activation key from an activation broker via a short-range wireless communication technology, the activation key including information for authenticating wireless communication between a wireless agent and the wireless access point. The method may also include authenticating wireless communication between the wireless agent and the wireless access point based at least on the activation key information. The method may further include associating the wireless agent for wireless communication with the wireless access point.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
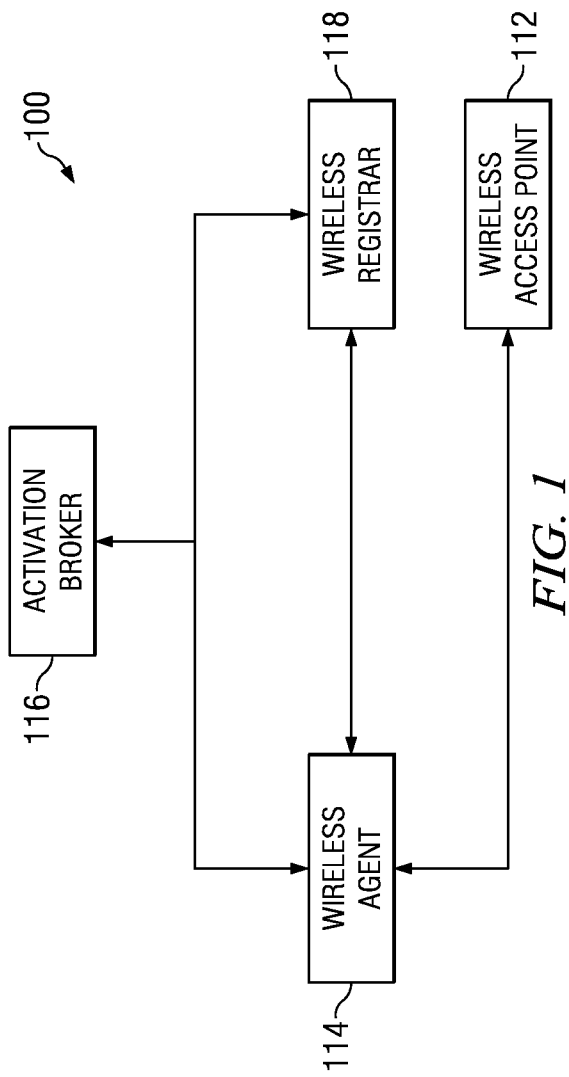
FIG. 1 illustrates a block diagram of an example system for configuring devices for wireless communication, in accordance with an embodiment of the present disclosure.

Preferred embodiments and their advantages are best understood by reference to FIGS. 1-4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

For the purposes of this disclosure, the terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), BLUETOOTH, ISO 14443, ISO 15693, or other suitable standard), personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

For the purpose of this disclosure, "short-range wireless communications technology" refers to any suitable communications transport, protocol, and/or standard allowing two or more suitably-configured devices to communicate via wireless transmissions provided that such devices are within approximately one meter of each other. Examples of short-range communications technologies include, without limitation, BLUETOOTH Class 3, near field communication (NFC), radio frequency identification (RFID), proximity card, vicinity card, ISO 14443, and ISO 15693.

FIG. 1 illustrates a block diagram of an example system 100 for configuring devices for wireless communication, in accordance with an embodiment of the present disclosure. As depicted, system 100 may include a wireless access point 112, a wireless agent 114, an activation broker 116, and a wireless registrar 118.

Wireless access point 112 may include any system, device or apparatus operable to communicatively couple one or more devices together to form a network. Wireless access point 112 may be a part of a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data) via wireless transmissions. For example, wireless access point 112 may be configured to communicate with other devices via wireless transmissions, and thus may communicatively couple a plurality of wireless communication devices together to form a wireless network. In certain embodiments, wireless access point 112 may also be configured to communicate to one or more devices via wire-line transmissions, and thus may relay data among wireless devices and wired devices. Wireless access point 112 may be configured to communicate with other devices via any suitable communication protocol (e.g., TCP/IP) and/or standard (e.g., IEEE 802.11, Wi-Fi).

Wireless agent 114 may include any system, device or apparatus operable to communicate with wireless access point 112 and other devices coupled to wireless access point 112 via wireless transmissions. In some embodiments, wireless agent 114 may include or may be an integral part of a network interface. Such network interface may include any suitable system, apparatus, or device operable to serve as an interface wireless agent 114 and other wireless transmission-enabled devices (e.g., wireless access point 112). The network interface may enable wireless agent 114 to communicate with wireless transmission-enabled devices using any suitable wireless transmission protocol (e.g., TCP/IP) and/or standard (e.g., IEEE 802.11, Wi-Fi). In certain embodiments, the network interface may include a network interface card (NIC). In the same or alternative embodiments, the network interface may provide physical access to a networking medium and/or provide a low-level addressing system (e.g., through the use of Media Access Control addresses). In certain embodiments, the network interface may include a buffer for storing packets received from wireless transmission-enabled devices and/or a controller configured to process packets received from wireless transmission-enabled devices.

Wireless agent 114 may include or may be an integral part of a wireless communication device. For example, in one embodiment, wireless agent 114 may be an integral part of a desktop computer, a mobile computer (e.g., a "laptop" or "notebook"), or another suitable information handling system. In another embodiment, wireless agent 114 may be an integral part of a mobile phone, smart phone (e.g., a BLACKBERRY or a TREO), personal digital assistant, or another suitable mobile communication device. Wireless agent 114 may be embodied in hardware, software, or any combination thereof. In certain embodiments, wireless agent 114 may be embodied in whole or part by a program of instructions stored on a computer-readable medium and operable to execute on a processor.

Activation broker 116 may include any system, device or apparatus operable to store and/or generate one or more activation keys, wherein each of such activation keys includes information for authenticating wireless communication between a wireless agent 114 and a wireless access point 112. In the same or alternative embodiments, activation broker 116 may be operable to transmit an activation key to wireless agent 114 and/or wireless registrar 118. The transmission of the activation key to wireless agent 114 and/or the transmission of the activation key to wireless registrar 118 includes transmitting the activation key via a short-range wireless communication technology (e.g., BLUETOOTH Class 3, NFC, RFID, proximity card, ISO 14443, ISO 15693, or other suitable standard).

Activation broker 116 may include or may be an integral part of a wireless communication device. For example, in one embodiment, activation broker 116 may be an integral part of a desktop computer, a mobile computer (e.g., a "laptop" or "notebook"), wireless transmission-enabled cash register, or another suitable information handling system. In another embodiment, activation broker 116 may be an integral part of a mobile phone, smart phone (e.g., a BLACKBERRY or a TREO), personal digital assistant, or another suitable mobile communication device. Activation broker 116 may be embodied in hardware, software, or any combination thereof. In certain embodiments, activation broker 116 may be embodied in whole or part by a program of instructions stored on a computer-readable medium and operable to execute on a processor.

Wireless registrar 118 may include any system, device or apparatus operable to facilitate wireless communication authentication between wireless accent point 112 and a wireless agent 114 associated with the wireless registrar 118. For example, in some embodiments, wireless registrar 118 may store one or more configuration parameters associated with wireless access point 112 (e.g., service set identifiers (SSIDs), wireless encryption protocol (WEP) keys, and/or other parameters related to communication with and/or security for wireless access point 112). In response to receiving an identical or related (e.g., private/public key pair) activation key from each of activation broker 116 and wireless agent 114, wireless registrar 118 may authenticate wireless communication between wireless access point 112 and wireless agent 114. In the same or alternative embodiments, in response to receiving an identical or related (e.g., private/public key pair) activation key from each of activation broker 116 and wireless agent 114, wireless registrar may communicate to wireless agent 114 the one or more configuration parameters associated with wireless access point 112. After receiving such configuration parameters, wireless agent 114 may configure itself using the received configuration parameters, thereby allowing it to associate with wireless access point 112.

Wireless registrar 118 may include or may be an integral part of a wireless communication device. For example, in one embodiment, wireless registrar 118 may be an integral part of a desktop computer, a mobile computer (e.g., a "laptop" or "notebook"), wireless transmission-enabled cash register, or another suitable information handling system. In another embodiment, wireless registrar 118 may be an integral part of wireless access point 112. Wireless registrar 118 may be embodied in hardware, software, or any combination thereof. In certain embodiments, wireless registrar 118 may be embodied in whole or part by a program of instructions stored on a computer-readable medium and operable to execute on a processor.

Figure 2:
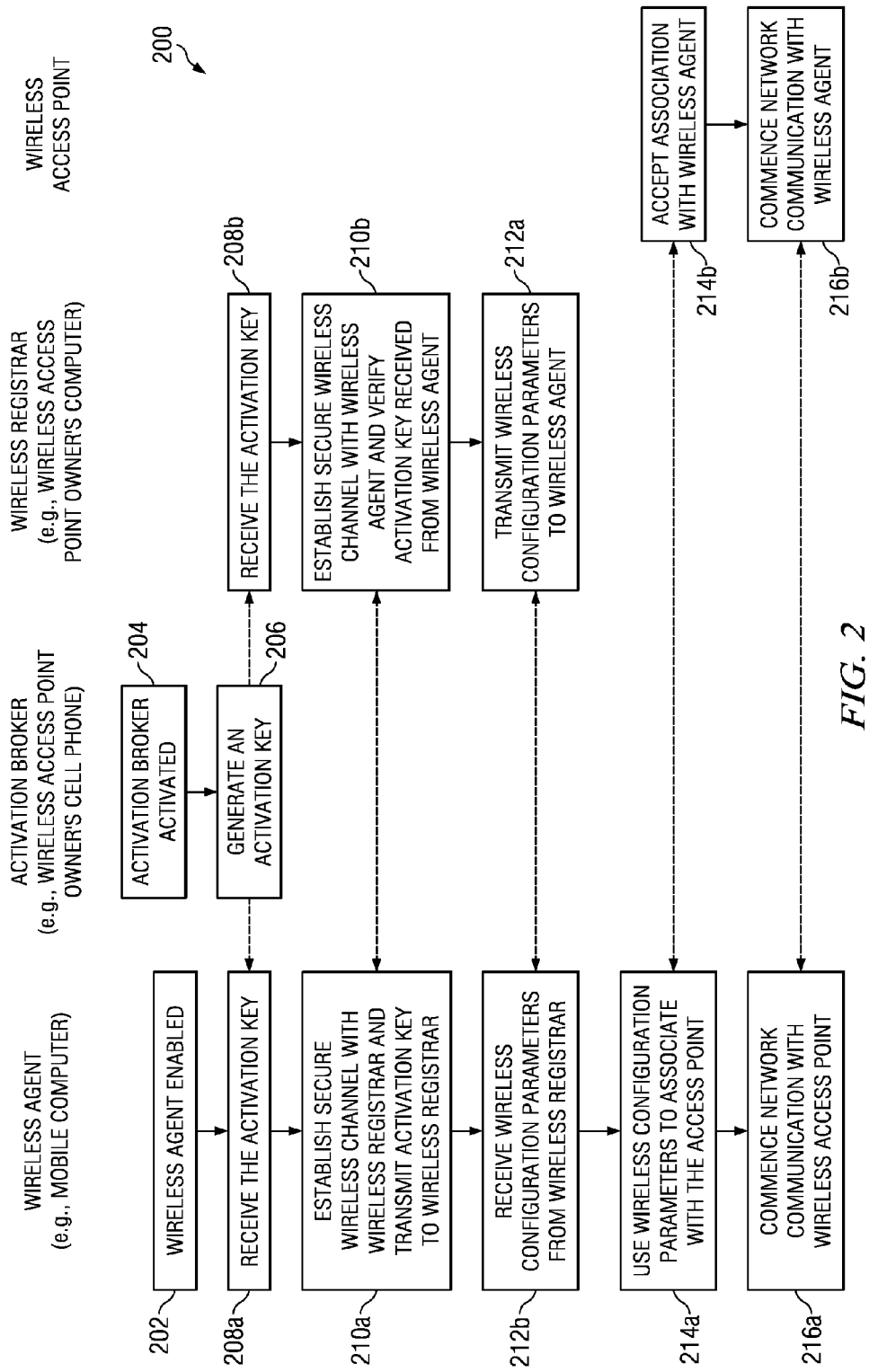
FIG. 2 illustrates a flow chart of an example method for configuring devices for wireless communication, in accordance with an embodiment of the present disclosure.

In certain embodiments of system 100, each of wireless agent 114, activation broker 116, wireless registrar 118 and wireless access point 112 may be integral parts of different devices (e.g., as discussed in FIG. 2). As a specific example of such an embodiment, wireless agent 114 may be an integral part of a mobile computer, activation broker 116 may be an integral part of a mobile phone, and wireless registrar 118 may be an integral part of an information handling system (e.g., home computer). In this specific embodiment, the activation broker 116 of the mobile phone may communicate the activation key to each of the wireless agent 114 of the mobile computer and the wireless registrar 118 of the home computer, and the wireless agent 114 may be authenticated for communication with wireless access point 112 as depicted in FIG. 2.

Figure 3:
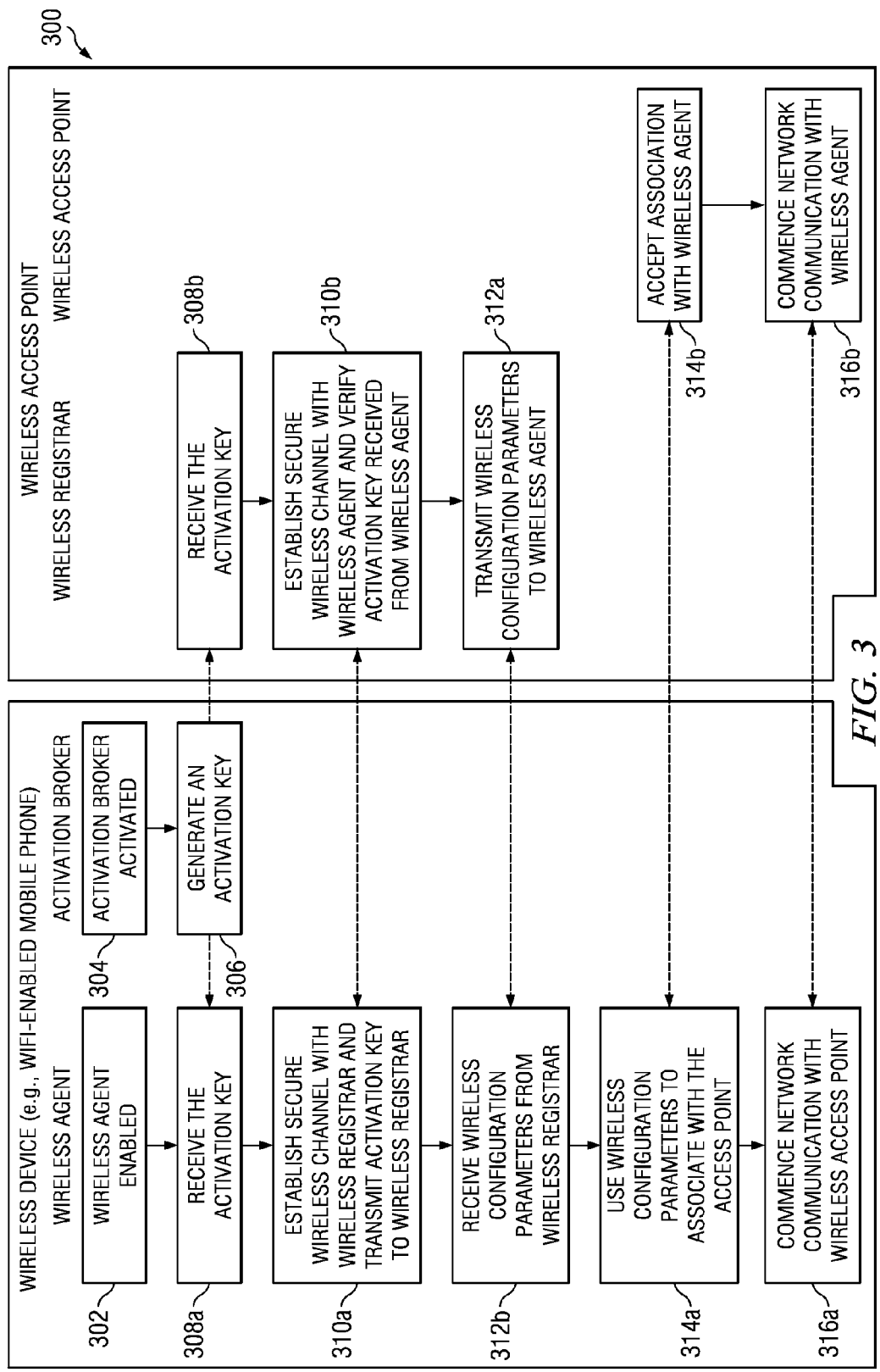
FIG. 3 illustrates a flow chart of a further example method for configuring devices for wireless communication, in accordance with an embodiment of the present disclosure.

In other embodiments of system 100, one or more of wireless agent 114, activation broker 116, wireless registrar 118 and wireless access point 112 may be integral parts of the same device. For example, wireless agent 114 and activation broker 116 may be integral parts of the same wireless device (e.g., a Wi-Fi-enabled mobile phone) and wireless registrar 118 may be an integral part of wireless access point 312. In such an embodiment, wireless agent 114 may be authenticated for communication with wireless access point 112 as depicted in FIG. 3.

Figure 4:
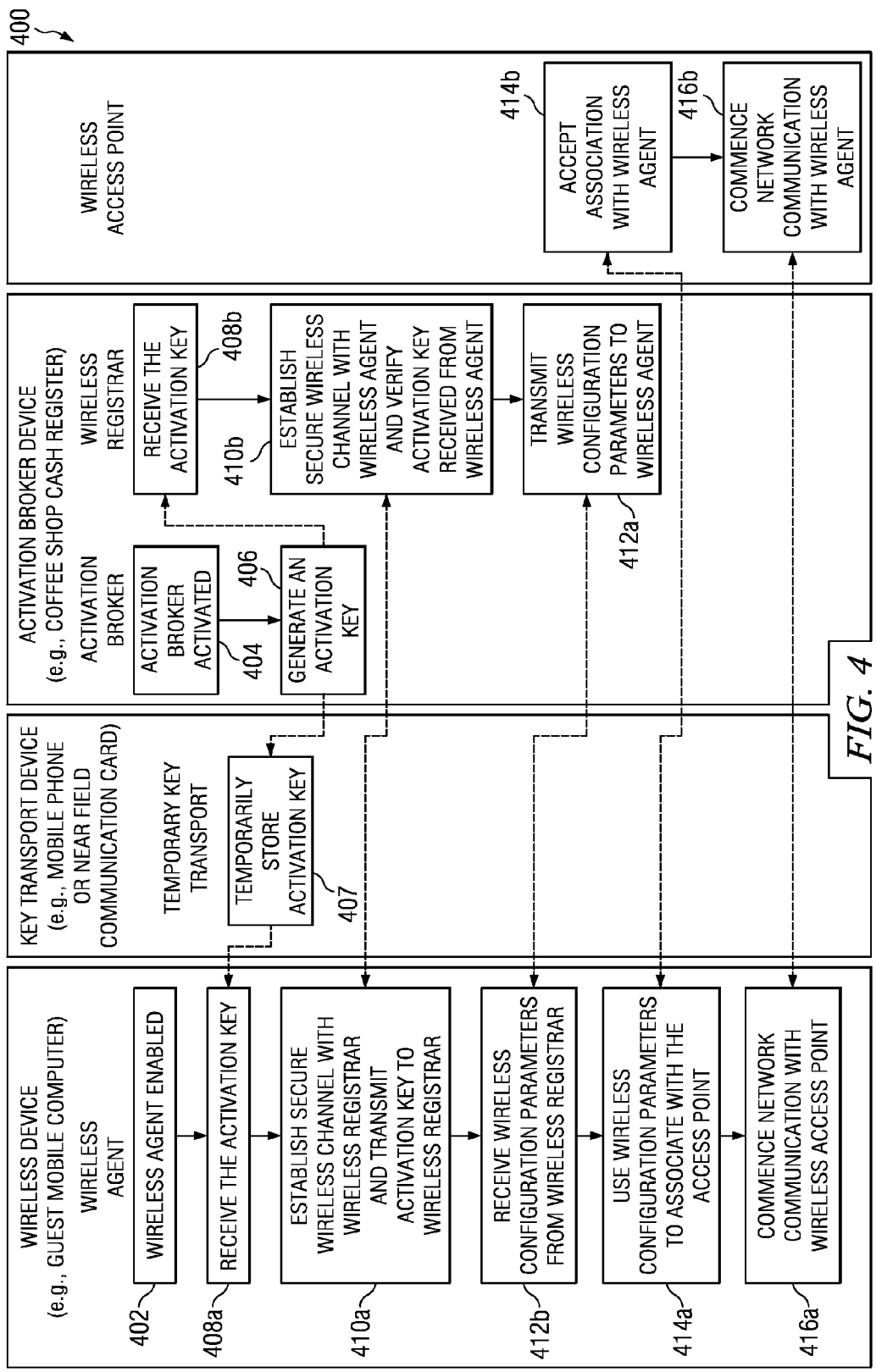
FIG. 4 illustrates a flow chart of another example method for configuring devices for wireless communication, in accordance with an embodiment of the present disclosure.

As another example, activation broker 116 and wireless registrar 118 may be integral parts of the same device (e.g., a desktop computer, mobile computer, cash register, or other information handling system). In such an embodiment, activation broker 116 may also communicate to wireless agent 114 (e.g., as an integral part of a mobile computer) via a temporary transport device (e.g., a mobile phone or near field communication-enabled card). In such an embodiment, wireless agent 114 may be authenticated for communication with wireless access point 112 as depicted in FIG. 4.

FIG. 2 illustrates a flow chart of an example method 200 for configuring devices for wireless communication, in accordance with an embodiment of the present disclosure. According to one embodiment, method 200 preferably begins at step 202. As noted above, teachings of the present disclosure may be implemented in a variety of configurations of system 100. As such, the preferred initialization point for method 200 and the order of the steps 202-216b comprising method 200 may depend on the implementation chosen.

At step 202, wireless agent 114 may be enabled. For example, a wireless device including wireless agent 114 may be powered on. As another example, a user of a wireless device including wireless agent 114 may manually enable wireless agent 114.

At step 204, activation broker 116 may be activated. For example, in embodiments where activation broker 116 is an integral part of a mobile phone, a user of the mobile phone may activate activation broker 116 by pressing an appropriate sequence of one or more keys.

At step 206, activation broker 116 may generate an activation key. As discussed above, the activation key may include information for authenticating wireless communication between wireless agent 114 and wireless access point 112. In certain embodiments, the activation key may be associated with a service level defining one or more parameters (e.g., network access privileges, length of session, allowed websites, allowed applications, allowed protocols, bandwidth limit, priority of service, etc.) associated with an authenticated wireless communication session between wireless agent 114 and wireless access point 112. For example, in an embodiment where wireless access point 112 is a public wireless access point (e.g., at a coffee shop or library) and wireless agent 114 is an integral part of a notebook computer, the activation key may be associated with a service level that allows wireless agent 114 to associate with wireless access point 112 and/or allows limited network access privileges. As another example, in an embodiment where wireless access point 112 is a private wireless access point (e.g., at a home or business) and wireless agent 114 is an integral part of a notebook computer with a user trusted by the owner of wireless access point 112, the activation key may be associated with a service level that allows a session of unlimited duration between wireless agent 114 and wireless access point 112 and/or allows unlimited or minimally-limited network access privileges.

At step 208a, activation broker 116 may transmit the activation key to wireless agent 114. In certain embodiments, activation broker 116 may transmit the activation key to wireless agent 114 via a short-range wireless communication technology (e.g., BLUETOOTH Class 3, NFC, RFID, proximity card, ISO 14443, ISO 15693, or other suitable standard). Similarly, at step 208b, activation broker 116 may transmit the activation key to wireless registrar 118. In certain embodiments, activation broker 116 may transmit the activation key to wireless registrar 118 via a short-range wireless communication technology (e.g., BLUETOOTH Class 3, NFC, RFID, proximity card, ISO 14443, ISO 15693, or other suitable standard).

At steps 210a and 210b, wireless agent 114 may establish a secure wireless channel (e.g., IEEE 802.11, Wi-Fi) with wireless registrar 118. In certain embodiments, the secure channel may use a Diffe-Hellman key exchange protocol or other suitable means of establishing a secure communication channel between wireless agent 114 and wireless registrar 118. At step 210a, wireless agent 114 may also transmit the activation key to wireless registrar 118. At step 210b, wireless registrar 118 may compare the activation key received from activation broker 116 to the activation key received from wireless agent 114. If wireless registrar 118 determines that the two received activation keys are identical or related (e.g., private/public key pair), method 200 may proceed to step 212a where it may authenticate communication between wireless agent 114 and wireless accent point 112.

At steps 212a and 212b, wireless registrar 118 may, in response to determining that the two received activation keys are identical or related, transmit one or more configuration parameters associated with wireless access point 112 (e.g., service set identifiers (SSIDs), wireless encryption protocol (WEP) keys, and/or other parameters related to communication with and/or security for wireless access point 112) to wireless agent 114.

Although FIG. 2 depicts the communications in steps 212a, 212b, 214a, and 214b as being directly between wireless agent 114 and wireless registrar 118, in certain embodiments, such communications may be routed through wireless access point 112.

At step 214a, wireless agent 114 may use the received wireless configuration parameters to configure itself for wireless communication with wireless access point 112 and/or associate with wireless access point 112. At step 214b, wireless access point 112 may accept association with wireless agent 114 if wireless access point 112 determines that the configuration parameters of the wireless agent 114 are identical or related to those of wireless access point 112.

At steps 216a and 216b, wireless agent 114 may commence wireless communication with wireless access point 112.

Although FIG. 2 discloses a particular number of steps to be taken with respect to method 200, it is understood that method 200 may be executed with greater or lesser steps than those depicted in FIG. 2. In addition, although FIG. 2 discloses a certain order of steps to be taken with respect to method 200, the steps comprising method 200 may be completed in any suitable order. For example, in certain embodiments, step 202 may executed before, after, or substantially contemporaneous with step 204. Method 200 may be implemented using system 100 or any other system operable to implement method 200. In certain embodiments, method 200 may be implemented partially or fully in software embodied in tangible computer-readable media.

FIG. 3 illustrates a flow chart of an example method 300 for configuring devices for wireless communication for a specific embodiment of system 100 wherein wireless agent 114 and activation broker 116 are integral parts of the same wireless device (e.g., a Wi-Fi-enabled mobile phone) and wireless registrar 118 is an integral part of wireless access point 312, in accordance with an embodiment of the present disclosure. According to one embodiment, method 300 preferably begins at step 302. As noted above, teachings of the present disclosure may be implemented in a variety of configurations of system 100. As such, the preferred initialization point for method 300 and the order of the steps 302-316b comprising method 300 may depend on the implementation chosen.

At step 302, wireless agent 114 may be enabled. For example, the wireless device including wireless agent 114 may be powered on. As another example, the user of the wireless device including wireless agent 114 may manually enable wireless agent 114.

At step 304, activation broker 116 may be activated. For example, a user of the wireless device including activation broker 116 may activate activation broker 116 by pressing an appropriate sequence of one or more keys.

At step 306, activation broker 116 may generate an activation key. As discussed above, the activation key may include information for authenticating wireless communication between wireless agent 114 and wireless access point 112. In certain embodiments, the activation key may be associated with a service level defining one or more parameters (e.g., network access privileges, length of session, allowed websites allowed applications, allowed protocols, bandwidth limit, priority of service, etc.) associated with an authenticated wireless communication session between wireless agent 114 and wireless access point 112.

At step 308a, activation broker 116 may transmit the activation key to wireless agent 114. Similarly, at step 308b, activation broker 116 may transmit the activation key to wireless registrar 118. In certain embodiments, activation broker 116 may transmit the activation key to wireless registrar 118 via a short-range wireless communication technology (e.g., BLUETOOTH Class 3, NFC, RFID, proximity card, ISO 14443, ISO 15693, or other suitable standard).

At steps 310a and 310b, wireless agent 114 may establish a secure wireless channel (e.g., IEEE 802.11, Wi-Fi) with wireless registrar 118. In certain embodiments, the secure channel may use a Diffe-Hellman key exchange protocol or other suitable means of establishing a secure communication channel between wireless agent 114 and wireless registrar 118. At step 310a, wireless agent 114 may also transmit the activation key to wireless registrar 118. At step 310b, wireless registrar 118 may compare the activation key received from activation broker 116 to the activation key received from wireless agent 114. If wireless registrar 118 determines that the two received activation keys are identical or related (e.g., private/public key pair), method 300 may proceed to step 312a where it may authenticate communication between wireless agent 114 and wireless accent point 112.

At steps 312a and 312b, wireless registrar 118 may, in response to determining that the two received activation keys are identical or related, transmit one or more configuration parameters associated with wireless access point 112 (e.g., service set identifiers (SSIDs), wireless encryption protocol (WEP) keys, and/or other parameters related to communication with and/or security for wireless access point 112) to wireless agent 114.

At step 314a, wireless agent 114 may use the received wireless configuration parameters to configure itself for wireless communication with wireless access point 112 and/or associate with wireless access point 112. At step 314b, wireless access point 112 may accept association with wireless agent 114 if wireless access point 112 determines the configuration parameters of the wireless agent 114 are identical or related to those of wireless access point 112.

At steps 316a and 316b, wireless agent 114 may commence wireless communication with wireless access point 112.

Although FIG. 3 discloses a particular number of steps to be taken with respect to method 300, it is understood that method 300 may be executed with greater or lesser steps than those depicted in FIG. 3. In addition, although FIG. 3 discloses a certain order of steps to be taken with respect to method 300, the steps comprising method 300 may be completed in any suitable order. For example, in certain embodiments, step 302 may executed before, after, or substantially contemporaneous with step 304. Method 300 may be implemented using system 100 or any other system operable to implement method 300. In certain embodiments, method 300 may be implemented partially or fully in software embodied in tangible computer-readable media.

FIG. 4 illustrates a flow chart of an example method 400 for configuring devices for wireless communication for a specific embodiment of system 100 wherein activation broker 116 and wireless registrar 118 are integral parts of the same wireless device (e.g., a desktop computer, mobile computer, cash register, or other information handling system) and activation broker communicates with wireless agent 114 via an intermediate key transport device (e.g., a mobile phone), in accordance with an embodiment of the present disclosure. According to one embodiment, method 400 preferably begins at step 402. As noted above, teachings of the present disclosure may be implemented in a variety of configurations of system 100. As such, the preferred initialization point for method 400 and the order of the steps 402-416b comprising method 400 may depend on the implementation chosen.

At step 402, wireless agent 114 may be enabled. For example, a wireless device (e.g., a mobile computer) including wireless agent 114 may be powered on. As another example, a user of a wireless device including wireless agent may manually enable wireless agent 114.

At step 404, activation broker 116 may be activated. For example, in embodiments where activation broker 116 is an integral part of an information handling system (e.g., a cash register), a user of the information handling system may activate activation broker 116 by pressing an appropriate sequence of one or more keys.

At step 406, activation broker 116 may generate an activation key. As discussed above, the activation key may include information for authenticating wireless communication between wireless agent 114 and wireless access point 112. In certain embodiments, the activation key may be associated with a service level defining one or more parameters (e.g., network access privileges, length of session, allowed websites, allowed applications, allowed protocols, bandwidth limit, priority of service, etc.) associated with an authenticated wireless communication session between wireless agent 114 and wireless access point 112.

At step 407, activation broker may transmit the activation key to a temporary key transport of a key transport device (e.g., a mobile phone or near field communication-enabled proximity card). In certain embodiments, activation broker 116 may transmit the activation key to the temporary key transport via a short-range wireless communication technology (e.g., BLUETOOTH Class 3, NFC, RFID, proximity card, ISO 14443, ISO 15693, or other suitable standard).

At step 408a, the temporary key transport may transmit the activation key to wireless agent 114. In certain embodiments, activation broker 116 may transmit the activation key to wireless agent 114 via a short-range wireless communication technology (e.g., BLUETOOTH Class 3, NFC, RFID, proximity card, ISO 14443, ISO 15693, or other suitable standard). Similarly, at step 408b, activation broker 116 may transmit the activation key to wireless registrar 118.

At steps 410a and 410b, wireless agent 114 may establish a secure wireless channel (e.g., IEEE 802.11, Wi-Fi) with wireless registrar 118. In certain embodiments, the secure channel may use a Diffe-Hellman key exchange protocol or other suitable means of establishing a secure communication channel between wireless agent 114 and wireless registrar 118. At step 410a, wireless agent 114 may also transmit the activation key to wireless registrar 118. At step 410b, wireless registrar 118 may compare the activation key received from activation broker 116 to the activation key received from wireless agent 114. If wireless registrar 118 determines that the two received activation keys are identical or related (e.g., private/public key pair), method 400 may proceed to step 412a where it may authenticate communication between wireless agent 114 and wireless accent point 112.

At steps 412a and 412b, wireless registrar 118 may, in response to determining that the two received activation keys are identical or related, transmit one or more configuration parameters associated with wireless access point 112 (e.g., service set identifiers (SSIDs), wireless encryption protocol (WEP) keys, and/or other parameters related to communication with and/or security for wireless access point 112) to wireless agent 114.

Although FIG. 4 depicts the communications in steps 412a, 412b, 414a, and 414b as being directly between wireless agent 114 and wireless registrar 118, in certain embodiments, such communications may be routed through wireless access point 112.

At step 414a, wireless agent 114 may use the received wireless configuration parameters to configure itself for wireless communication with wireless access point 112 and/or associate with wireless access point 112. At step 414b, wireless access point 112 may accept association with wireless agent 114, if wireless access point 112 determines the configuration parameters of the wireless agent 114 are identical or related to those of wireless access point 112.

At steps 416a and 416b, wireless agent 114 may commence wireless communication with wireless access point 112.

Although FIG. 4 discloses a particular number of steps to be taken with respect to method 400, it is understood that method 400 may be executed with greater or lesser steps than those depicted in FIG. 4. In addition, although FIG. 4 discloses a certain order of steps to be taken with respect to method 400, the steps comprising method 400 may be completed in any suitable order. For example, in certain embodiments, step 402 may executed before, after, or substantially contemporaneous with step 404. Method 400 may be implemented using system 100 or any other system operable to implement method 400. In certain embodiments, method 400 may be implemented partially or fully in software embodied in tangible computer-readable media.

Using the methods and systems disclosed herein, a network system may be provided that allows for the configuration of devices for wireless communication, with little or no input from a user, thus reducing or eliminating difficulties associated with wireless network configuration.

Although the present disclosure has been described in detail, it should be understood that various changes, substitutions, and alterations can be made hereto without departing from the spirit and the scope of the invention as defined by the appended claims.

What is claimed is:

1. A system, comprising:
  a wireless agent; and
  an activation broker communicatively coupled to the wireless agent, the activation broker configured to:
    transmit an activation key from the activation broker to the wireless agent, the activation key including information for authenticating wireless communication between the wireless agent and a wireless access point; and
    transmit, via a short-range wireless communication technology, the activation key from the activation broker to a wireless registrar communicatively coupled to the activation broker.

2. The system of claim 1, wherein the short-range wireless communication technology is selected from the group consisting of Bluetooth Class 3, near field communication, radio frequency identification, ISO 14443, and ISO 15693.

3. The system of claim 1, the activation broker further configured to select the activation key from a plurality of activation keys, each associated with a different service level for wireless communications between the wireless agent and the wireless access point.

4. The system of claim 1, wherein the activation broker and the wireless agent are integral components of a mobile communication device, a personal digital assistant, or a mobile computer.

5. The system of claim 1, wherein the wireless agent is an integral part of a mobile communication device, a personal digital assistant, or a mobile computer.

6. The system of claim 1, wherein the wireless registrar is an integral part of the wireless access point.

7. A system, comprising:
  an activation broker configured to transmit an activation key to a wireless registrar associated with a wireless access point via a short-range wireless communication technology; and
  a wireless agent communicatively coupled to the activation broker, the wireless agent configured to:
    receive the activation key from the activation broker;
    authenticate wireless communication with the wireless access point based at least on the activation key information; and
    associate the wireless agent for wireless communication with the wireless access point;
  wherein the activation key includes information for authenticating wireless communication between the wireless agent and the wireless access point.

8. The system of claim 7, wherein the short-range wireless communication technology is selected from the group consisting of Bluetooth Class 3, near field communication, radio frequency identification, ISO 14443, and ISO 15693.

9. The system of claim 7, the activation broker further configured to select the activation key from a plurality of activation keys, each associated with a different service level for wireless communications between the wireless agent and the wireless access point.

10. The system of claim 7, wherein the wireless agent is an integral part of a mobile communication device, a personal digital assistant, or a mobile computer.

11. The system of claim 7, wherein the wireless registrar is an integral part of the wireless access point.

12. A system, comprising:
  an activation broker configured to transmit an activation key to a wireless agent via a short-range wireless communication technology;
  a wireless registrar associated with a wireless access point and configured to:
    receive an activation key from the activation broker, the activation key including information for authenticating wireless communication between a wireless agent and the wireless access point; and
    authenticating wireless communication between a wireless agent and the wireless access point based at least on the activation key information.

13. The system of claim 12, wherein the short-range wireless communication technology is selected from the group consisting of Bluetooth Class 3, near field communication, radio frequency identification, ISO 14443, and ISO 15693.

14. The system of claim 12, the activation broker configured to select the activation key from a plurality of activation keys, each associated with a different service level for wireless communications between the wireless agent and the wireless access point.

15. The system of claim 12, wherein the wireless agent is an integral part of a mobile communication device, a personal digital assistant, or a mobile computer.

16. The system of claim 12, wherein the activation broker and the wireless registrar are an integral parts of an activation broker device.

17. The system of claim 16, wherein the activation broker device comprises one of a mobile communication device, a mobile computer, and a cash register.

* * * * *